Patented Mar. 19, 1940

2,193,823

UNITED STATES PATENT OFFICE 2,193,823

CHLORINATED AROMATIC HYDROCARBONS

Arthur A. Levine and Oliver W. Cass, Niagara Falls, N. Y., assignors to E. I. du Pont de Nemours & Company, Wilmington, Del., a corporation of Delaware No Drawing. Application April 9, 1937, Serial No. 136,024

7 Claims. (Cl. 260—650)

This invention relates to the preparation of valuable chlorinated aromatic compounds. More particularly, it relates to the preparation of pentachlorostyrene from ethylpentachlorobenzene as a starting material.

Ethylpentachlorobenzene is readily prepared by the chlorination of ethylbenzene, by maintaining certain critical conditions during the chlorination, and separating the desired ethylpentachlorobenzene product from the reaction mixture. A process for preparing ethylpentachlorobenzene in this manner is disclosed in our co-pending application, Ser. No. 68,919, filed March 14, 1936.

Our process for the preparation of pentachlorostyrene from ethylpentachlorobenzene involves two steps. In the first step ethylpentachlorobenzene is reacted with chlorine under conditions such that alpha-chloroethylpentachlorobenzene is formed. In the second step the alpha-chloroethylpentachlorobenzene is converted to styrene by the removal of hydrogen chloride therefrom.

Accordingly, one of the objects of this invention involves the preparation of pentachlorostyrene from ethylpentachlorobenzene in satisfactory yield. Another object of our invention is the preparation of the desired product, pentachlorostyrene, by means of a two-stage process involving two separate chemical reactions. The first of these reactions involves the preparation of alpha-chloroethylpentachlorobenzene, and the second, the conversion of that product to the desired product, pentachlorostyrene.

It may also be stated that pentachlorostyrene having the formula:

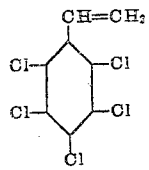

is a new compound and has never before been produced nor described in chemical literature. It is therefore a further object of this invention to produce this new chemical compound, pentachlorostyrene, a compound which is and may be of distinct utility in the field of chemical manufacture.

In order to convert ethyl pentachlorobenzene to alpha-chloroethylpentachlorobenzene, the ethylpentachlorobenzene starting material may be reacted with chlorine at an elevated temperature and in the presence of light.

The ethylpentachlorobenzene may be heated to a temperature of 60 to 200° C. and chlorine gas fed into the molten compound. During the reaction the temperature may be permitted to fall somewhat, but should be maintained high enough to keep the chlorinated ethylpentachlorobenzene in the liquid state. The light from an ordinary electric light bulb may be permitted to shine on the reactants.

The compound alpha-chloroethylpentachlorobenzene is a liquid at room temperature. It may be shaken with moistened sodium carbonate in order to free it from residual chlorine. It may then be vacuum distilled and re-distilled in order to obtain a product melting at 50 to 55° C. The reaction is as follows:

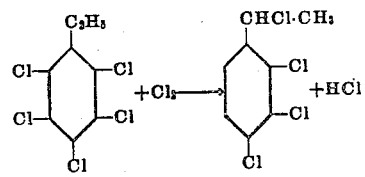

In order to convert alpha-chloroethylpentachlorobenzene to pentachlorostyrene, two methods are possible. The alpha-chloroethylpentachlorobenzene may be subjected to a relatively high temperature, one in excess of 300° C. This results in thermal decomposition of the alpha-chloroethylpentachlorobenzene and the formation of pentachlorostyrene as a viscous product. The reaction occurring under these conditions is as follows:

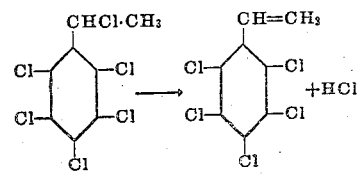

An alternative way of producing the desired new product, pentachlorostyrene, from alpha-chloroethylpentachlorobenzene, is by treatment of the latter with a base. Preferably an alcoholic solution of the base, such an alcoholic potassium hydroxide, is utilized.

The alpha-chloroethylpentachlorobenzene is preferably treated with the alcoholic solution of the base and refluxed for one to three hours. At the end of that time a viscous oily product is obtained which is pentachlorostyrene. The reaction occurring is as follows:

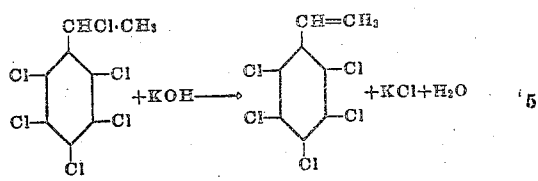

As an example of our novel process for converting ethylpentachlorobenzene to the valuable new product, pentachlorostyrene, the following may be given:

EXAMPLE

First Stage.—Conversion of Ethylpentachlorobenzene to Alpha-Chloroethylpentachlorobenzene

386 grams (1.38 mols) of recrystallized ethylpentachlorobenzene was melted in a one-liter flask equipped with a stirrer, a chlorine inlet tube, a thermometer and a reflux leading to a hydrogen chloride trap containing water. A 200 watt lamp was positioned about three inches from the flask.

The ethylpentachlorobenzene was then heated to about 200° C. and chlorine added until the water in the hydrogen chloride trap had gained in weight to the extent of 41 grams. This means that hydrogen chloride in this amount had been evolved. During the latter portion of the reaction the temperature was permitted to fall to about 110° C. The gain in weight of the contents of the flask was approximately 26 grams.

The product was now liquid at room temperature. It was first treated with moistened sodium carbonate and then filtered. The filtrate was then subjected to vacuum distillation and vacuum re-distillation, utilizing a Clark flask.

Upon re-distillation the following products were obtained:

| Fraction | | Boiling range at 15 mm. pressure | Weight in grams |
|---|---|---|---|
| | | °C. | |
| 1 | Unchanged ethylpentachlorobenzene | 178–187 | 210 |
| 2 | Intermediate product | 182–193 | 33 |
| 3 | Alpha-chloroethylpentachlorobenzene | 193–203 | 92 |
| 4 | Residue | Over 203 | 15 |

The 210 g. fraction (1) melted at 53°–55° C., and when mixed with a sample of the original ethyl pentachlorobenzene, produced no depression in the melting point of this compound. This fraction was therefore recovered unchlorinated ethyl pentachlorobenzene. The 92 g. portion (3) was liquid at room temperature, but upon cooling to 20° C., solidified, and then showed a melting point of 52.5° C. When a portion of this material was mixed with a portion of fraction (1), the mixture was liquid at 10° C. Fraction (2) was also liquid at 10° C. This behavior indicates that fractions (1) and (3), in spite of their similar boiling points, are different compounds. Fraction (3) may be rapidly distilled at atmospheric pressure with only slight decomposition, boiling at 320–325° C. under these conditions. A determination of the molecular weight by the boiling point elevation method gave 308 and 314. The calculated value for $C_6Cl_5C_2H_4Cl$ is 313. Fraction (3) is therefore alpha-chloroethylpentachlorobenzene.

Second Stage.—Conversion of Alpha-Chloroethylpentachlorobenzene to Pentachlorostyrene

1. By thermal decomposition 92 g. (about 0.3 mol.) of alpha-choroethylpentachlorobenzene, obtained from the first stage, was slowly distilled through a four inch packed column. The boiling range of the major portion of the sample was 305–310° C. Hydrogen chloride was freely evolved during the distillation and collected in a weighed water trap. 9 g. hydrogen chloride was secured upon the first distillation. The condensate was returned to the flask, and redistilled. 1 g. additional hydrogen chloride was secured. 70 g. condensate was collected from this distillation, the entire amount boiling between 308–312° C. The balance of the original material remained as a tarry residue in the flask. The 10 g. hydrogen chloride secured represents 0.27 mol., or 90% of the theoretical hydrogen chloride resulting from the removal of one mol. of hydrogen chloride from each mol. alpha-chloroethylpentachlorobenzene used.

The product was freed from traces of hydrogen chloride by shaking with soda ash, and then filtered. It was a colorless, slightly viscous oil, density 1.61 at 26° C., boiling point 311°–312° C. Molecular weight determinations by the boiling point elevation method gave 272 and 274. The calculated value for pentachlorostyrene

$$(C_6Cl_5C_2H_3)$$

is 276.5. The product was therefore pentachlorostyrene.

2. Reaction of alpha-chloroethylpentachlorobenzene with a base 62.6 g. (0.2 mol.) alpha-chloroethylpentachlorobenzene was refluxed for three hours with a solution of 15 g. caustic potash in 300 cc. absolute alcohol. At the end of that time the precipitated potassium chloride was filtered off, washed with absolute alcohol, and dried. There was secured 12 g. (0.16 mol.) potassium chloride. The filtrate was poured out into 2000 cc. water, the oily layer separated, dried, and distilled. There was thus secured 48 g. (0.17 mol.) pentachlorostyrene, boiling constantly at 311° C., and identical in properties with the pentachlorostyrene prepared by thermal decomposition as in the preceding example.

Pentachlorostyrene, prepared as above, is a colorless, viscous oil, boiling point 311–312° C., setting to a hard, glassy mass when immersed in a cold bath at −50° C. It does not show the usual addition reactions of styrene, reacting only very slowly with a cold solution of bromine in carbon tetrachloride, and remaining fluid and unpolymerized after two weeks in direct sunlight, or after 24 hours at 200° C., or after 6 hours' heating at 200° C. with a trace of sulfuric acid.

It should be understood that our invention has been described in relation to our preferred method, and that various other embodiments might be devised which would still come within the scope of the invention. It is our intention, therefore, that our invention is not to be restricted to the various details previously given merely as illustrative, but is to be construed in accordance with the prior art and the appended claims.

We claim:

1. A process for preparing pentachlorostyrene which comprises passing chlorine gas into liquid ethylpentachlorobenzene maintained at a temperature within the range 60–200° C. in the presence of light but in the absence of a halogenation catalyst until there has been introduced substantially one atom of chlorine per mol of ethylpentachlorobenzene, and then heating the resultant product to a temperature in excess of 300° C., but not sufficiently high to cause excessive decomposition of pentachlorostyrene.

2. A process for preparing alpha-chloroethylpentachlorobenzene which comprises passing chlorine gas into liquid ethylpentachlorobenzene maintained at a temperature within the range 60–200° C. in the presence of light but in the absence of a halogenation catalyst until there has been introduced substantially one atom of chlorine per mol of ethylpentachlorobenzene.

3. A process for preparing pentachlorostyrene which comprises heating alpha-chloroethylpentachlorobenzene to a temperature in excess of 300° C., but not sufficiently high to cause excessive decomposition of pentachlorostyrene, thereby removing one mol of hydrogen chloride per mol of alpha-pentachlorobenzene and forming the desired product.

4. Pentachlorostyrene.

5. Pentachlorostyrene, said product being a colorless, viscous liquid at room temperature, having a boiling point of approximately 311–312° C. at normal atmospheric pressure, a density of approximately 1.61 at 26° C., and forming a hard, glassy mass when subjected to a temperature of −50° C.

6. Alpha-chloroethylpentachlorobenzene.

7. Alpha-chloroethylpentachlorobenzene, said product constituting a liquid having an atmospheric boiling point of 320–325° C.

ARTHUR A. LEVINE.
OLIVER W. CASS.